Oct. 24, 1933.  E. G. GOODELL  1,931,536
PROCESS FOR RECOVERING AND UTILIZING VALUES FROM BLACK LIQUOR
Filed July 25, 1931
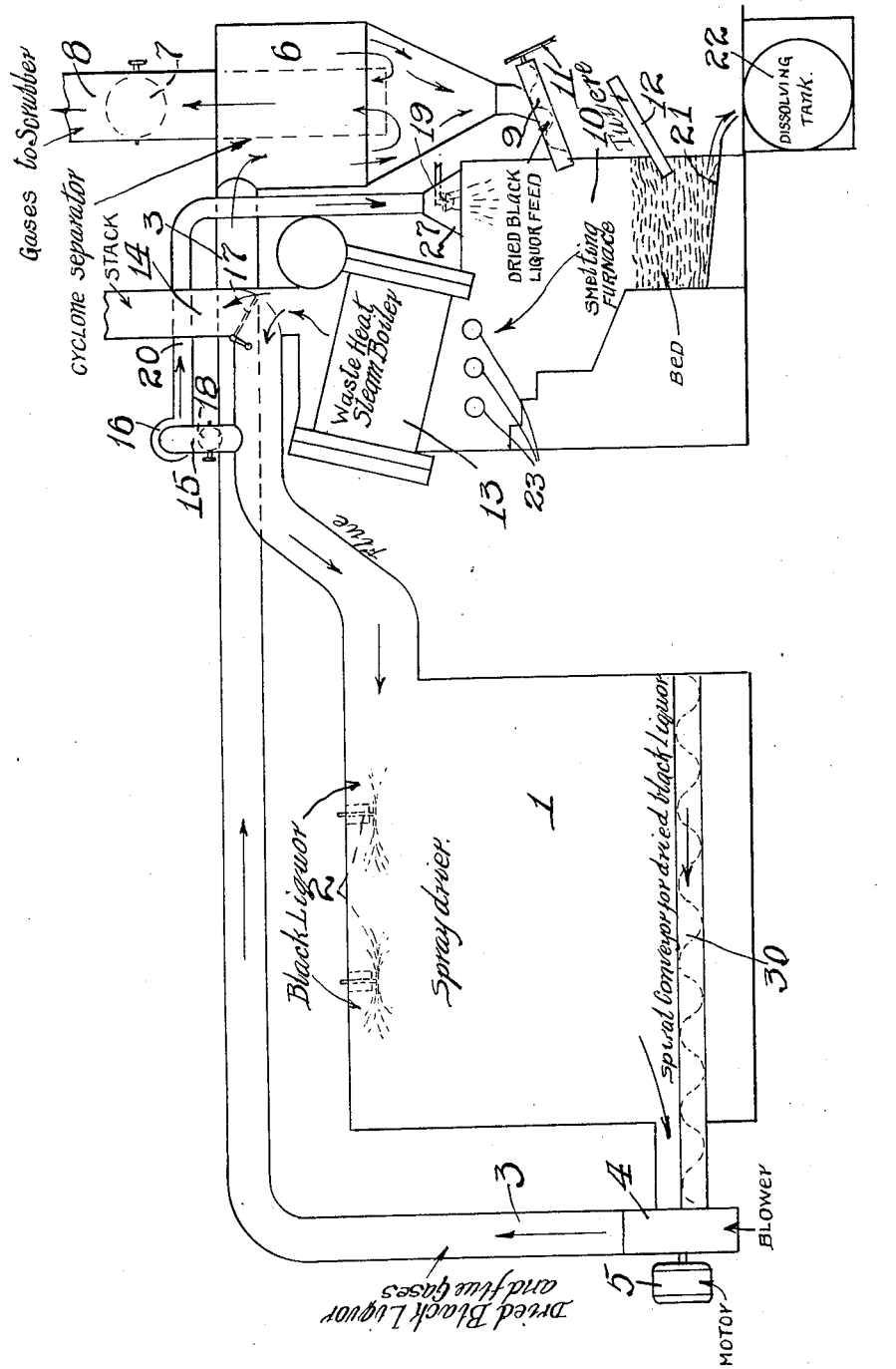
Inventor
Edward G. Goodell
by Charles Hill
Attys Patented Oct. 24, 1933

1,931,536

UNITED STATES PATENT OFFICE 1,931,536

PROCESS FOR RECOVERING AND UTILIZING VALUES FROM BLACK LIQUOR

Edward G. Goodell, Stevens Point, Wis.

Application July 25, 1931. Serial No. 553,041

7 Claims. (Cl. 23—48)

This invention relates to improvements in a process for regenerating black liquors such as are obtained in the manufacture of sulphate or soda pulp.

More particularly this invention relates to improvements in the operation of smelting furnaces used in processes employed in the regeneration of spent black liquors including the recovery of their alkaline constituents and calorific value obtainable from the combustion of their organic contents.

In the manufacture of pulp by the soda or sulphate processes the wood is treated in closed vessels under pressure with steam and with cooking liquors. Sulphate cooking liquor is composed principally of sodium hydroxide, sodium sulfide and sodium carbonate. When this treatment is completed the contents of the closed vessels are blown into diffusers or wash tanks where the spent cooking liquor is separated from the pulp by draining and washing. This spent liquor is known as "black liquor" and is generally recovered by concentration in vacuum or direct heat evaporators producing a heavy sirup-like black liquor high in organic content and containing nearly all of the sodium compounds used in the cooking process.

The final steps in the recovery of the concentrated black liquor are effected by various methods. In some cases the concentrated black liquor is fed into a rotary incinerator where it is dried and burned to form what is commonly known as "black ash". In other cases the heavy black liquor is sprayed directly into a smelting furnace where it is burned and the sodium compounds fused off and recovered. In the processes described in my Patents Nos. 1,779,535; 1,779,536; 1,779,537, and 1,779,768 dated October 28th, 1930 the concentrated black liquor is first converted into a moisture-free powder and this powder is then treated under controlled reducing conditions to reduce the sulphate to sulfide and to recover the fused sodium compounds while at the same time utilizing the heat of combustion to dehydrate the black liquor. In all of the recovery processes however the final step consists of the burning of the organic matter and the fusing of the sodium compounds in a smelting furnace.

My present invention relates particularly to improvements in the methods followed in burning the black liquor in the smelting furnace in the form of a spray or in the form of a dried black liquor powder or in the burning of both sprayed black liquor and dried black liquor powder in combination. This latter process is particularly described in my Patent No. 1,779,537 mentioned above.

I have now found however that in the operation of the above mentioned processes according to my prior patents it is advantageous to control the zone of combustion of both the sprayed black liquor and the black liquor powder. The high temperatures obtaining in the smelting furnace result in the volatilization of the combustible material at or very near the point of entrance of said sprayed black liquor or powder. If this volatilization takes place under oxidizing conditions it is accompanied almost immediately by combustion. This immediate combustion is not conductive to best results, as it reduces the overall efficiency of the reduction of the sulphate to sulfide.

I have found that it is possible to control the combustion by introducing an inert gas into the smelting furnace at or near the point of entrance of the sprayed black liquor or dried black liquor powder. This inert gas has the effect of retarding the combustion of the volatile constituents and permits the sprayed concentrated liquor or the dried black liquor powder to be projected into the smelting furnace for some distance before combustion of its organic content occurs.

A preferred embodiment of my novel control feature resides in the supplying of a heated inert gas which, in the case of spraying the black liquor directly into the smelting furnace, has the additional advantage of acting as a drying and evaporating agent to expel moisture from the sprayed black liquor prior to combustion of its organic content.

It is therefore an object of this invention to provide a process for controlling the combustion of black liquor in a smelting furnace.

It is a further object of this invention to provide a process for controlling the smelting furnace operation in the regeneration of black liquor, whereby the combustion of the organic constituents in the black liquor is retarded to produce a more efficient and economical operation.

A specific object of this invention is to provide an improved process of regenerating black liquor to recover valuable alkaline substances therefrom by introducing the black liquor into a smelting furnace in the presence of an inert gas.

Other and further important objects of this invention will be apparent from the disclosures in the specification and the accompanying drawing.

This invention (in a preferred form) is illustrated in the drawing and hereinafter more fully described.

In the accompanying drawing which illustrates more or less diagrammatically the means for carrying out my invention, the reference numeral 1 indicates a spray drier into which concentrated black liquor is fed from spray devices 2. Evaporation in the spray drier 1 is effected by hot flue gases. The dried black liquor collects in the bottom of the spray drier 1 is removed therefrom by a spiral conveyor 30 or by other means and is blown together with the flue gases through a duct or pipe 3 by means of a blower 4 suitably driven by any power means such as a motor 5. The dried black liquor and flue gases from the duct 3 are led into a cyclone powder collector 6, wherein the dried black liquor powder may be freed from the flue gases. The cyclone powder collector may if desired be operated so that a part of the flue gases remain admixed with the dried black liquor by closing the damper 7 in the gas outlet stack 8.

The dried black liquor is in the form of a fine powder and is fed from the dust collector by means of a spiral conveyor 9 or any other suitable means into a smelting furnace 10. The conveyor 9 is driven by any suitable means such as by a belt 11 connected to a motor (not shown). Air is introduced into the smelting furnace 10 through a tuyere or blow pipe 12 located near the bottom thereof. The organic matter in the dried black liquor fed to the smelting furnace is partially burned and the hot gases of this partial combustion are directed into a steam boiler or generator 13 where additional air is introduced through openings or nozzles 23 in the boiler setting and complete combustion of the gases takes place. Part of the calorific value of these gases is expended in supplying steam which may be used to run the evaporators to concentrate the weak black liquor sufficiently that it may be fed into the spray drier and into the smelting furnace as shown. The flue gases after passing through the boiler 13 still contain a valuable heat content which heretofore was allowed to go either up the stack 14 or, in accordance with my previous inventions, to the spray drier 1.

According to my present invention, however, part of the flue gases upon leaving the steam boiler are drawn through a duct 15 by means of a fan 16 and blown into the smelting furnace 10, as at 27. Another part of the flue gases is allowed to pass through the spray drier 1, where their calorific content is utilized in dehydrating the concentrated black liquor. A damper arrangement is provided at 17 to automatically release the flue gases to the stack 14 when the flue to drier 1 is closed and vice versa, to automatically close the passage to the stack 14 when drier 1 is in operation. A further damper arrangement 18 may be provided in the duct 15 to regulate the amount of gases passing through the duct but ordinarily this is not necessary since this may be regulated by the fan 16 which is preferably provided with variable speed controls.

In the process where the smelting furnace is fed both with dried black liquor and with concentrated black liquor, a spray device 19 is located near the top of the smelting furnace 10 in the path of the incoming flue gases from the fan 16 through the pipe line or duct 20. The incoming hot flue gases envelop the spray from 19 and cause a partial dehydration of the concentrated black liquor without combustion of the organic material therein. The partially dehydrated black liquor then drops into the lower part of the smelting furnace where the organic products are volatilized and the volatile matter partially burned. Likewise the burning of the dried black liquor from the feed 9 is retarded by the flue gases from the fan 16 as well as from the flue gases from the cyclone separator with which it may be admixed.

When the dried black liquor from the feed 9 as well as the partially dehydrated black liquor from the spray 19 reach the lower part of the smelting furnace 10 the organic material is burned off and the gaseous products of combustion pass into the steam boiler 13 and from thence partly through the duct 15 and partly through the spray drier 1.

In ordinary practice the flue gases of the steam boiler are discharged at temperatures of around 500 to 600° F. Heretofore part of these flue gases were allowed to be drawn up the stack 14 and their heat value was therefore wasted. By means of my improved process it is possible to completely shut off the stack 14 from the operation by closing the damper 17 to the stack and using practically all of the calorific value of the flue gases from the steam boiler in the process of recovering the black liquor. The relatively cool gases may then finally be discharged from the process through the exit 8 of the cyclone collector and thence through a scrubber (not shown).

If desired, flue gases may be taken by fan 16 from the boiler at a point where the temperature of these gases reaches 1,000° F. or even higher so that the difference in temperature may be expended in the evaporation of the concentrated black liquor rather than in the formation of steam in the boilers.

The cyclone separator is ordinarily operated under back pressure in order to furnish a current of flue gases to the feed conveyor 9. In this operation the inert flue gases have no available calorific content but merely serve to assist in regulating the delivery of the dried black liquor powder to the furnace and in retarding its combustion upon its introduction into the smelting furnace.

In the sulphate process, sodium sulphate may be admixed with the dried black liquor fed into the smelting furnace to replace the amount of sulphate lost in the process.

Under the conditions obtaining in the smelting furnace, the sodium compounds are fused and are allowed to flow from the smelting furnace, as at 21, into a dissolving tank 22 wherein they are dissolved in water and reused in the pulp cooking operation.

It will thus be seen from the above discussion of my invention that the essential characteristics of my improved process reside in the provision of a pre-dehydration of the concentrated black liquor in the smelting furnace prior to its combustion together with a retarding of combustion. This method of operation has been found to be of much practical value in the operation of smelting furnaces of the type described and forms an important development in the process of regenerating black liquor.

The retarding of combustion of the organic materials present in the black liquor permits the substantially dehydrated black liquor to be deposited near the bottom of the smelting furnace before material combustion occurs. This causes a building up of a bed of burning dried black liquor and fused metallic values which flow from the bottom of the smelting furnace in a molten state. Being out of the turbulent area of the smelting furnace created by the flaming gases higher up in the furnace the alkali metal values are smoothly fused off without being volatilized. This causes an increased efficiency in the recovery of the alkalis since their volatilization is reduced to a minimum.

The building up of a bed of fused and burning materials near the bottom of the smelting furnace also increases the reduction of sulphate bodies to sulfide bodies in the event of regenerating black liquor from sulphate pulp.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. The process of recovering the alkaline values and utilizing the heat value of black liquor which comprises partially burning black liquor solids in a relatively deep bed in a smelting furnace, supplying a limited amount of air to said bed to maintain reducing conditions therein, fusing off the alkaline values therefrom, supplying additional air to the rising burning gases from the bed to thoroughly burn the same, directly utilizing heat from the burning gases in a steam generator to produce steam, subsequently passing the hot and now inert gases into direct contact with black liquor in finely comminuted form to dehydrate the same and introducing the dried black liquor powder so formed together with some of the inert gases into the smelting furnace to allow the powder to drop onto the fuel bed before being substantially burned.

2. The process of claim 1 in which part of the inert gases from the steam generator zone are admixed with sprayed black liquor in the smelting furnace to evaporate the said black liquor and allow the residues obtained to be projected toward the fuel bed of the furnace before being substantially burned.

3. In the process of recovering alkaline values and utilizing the heat values of black liquors, the steps which comprise feeding into a furnace a concentrated black liquor in the presence of an inert gas and dried black liquor solids admixed with an inert gas so as to retard combustion of the organic and carbonaceous materials in the black liquor and allow the same to be projected into the furnace toward the fuel bed without substantial burning, burning the black liquor solids in the fuel bed under reducing conditions and draining off the molten alkaline values from the fuel bed.

4. In the process of regenerating black liquor the steps which comprise introducing dried black liquor solids into a smelting furnace in admixture with an inert gas to prevent combustion of the black liquor solids near their point of entrance into the furnace, partially burning the black liquor solids in a fuel bed located near the bottom of the furnace, supplying additional air to the rising burning gases from the fuel bed at a point in the furnace above the place where the black liquor solids are introduced to thoroughly burn the gases and utilizing the heat of combustion for the generation of steam and dehydration of further quantities of black liquor.

5. In the process of recovering alkali metal values and heat resulting from combustion of black liquor, the steps which comprise introducing into a smelting furnace concentrated black liquor and black liquor powder together with inert gases to retard combustion of the organic materials present in the black liquor.

6. In the process of regenerating black liquor the steps which comprise spraying concentrated black liquor into contact with hot inert gases into a smelting furnace, feeding dried black liquor solids admixed with inert gases at a point in the furnace below the spray, allowing the residual black liquor solids to be deposited on the fuel bed of the furnace, partially burning the black liquor solids in the fuel bed and recovering the alkali metal values therefrom.

7. In the process of recovering alkali metal values from black liquor in a furnace and utilizing part of the heat resulting from combustion of the black liquor to produce steam in a steam generator, the step which comprises introducing black liquor into the smelting furnace in finely comminuted form admixed with hot inert gases from the steam generator region, said liquor and gases being projected downwardly into the furnace to envelop the comminuted black liquor thereby evaporating the same and allowing the resulting residues to be projected toward the bed of the furnace before being substantially burned.

EDWARD G. GOODELL.